J. R. WYATT.
INDUCTION FURNACE.
APPLICATION FILED JAN. 24, 1916.
1,201,671.
Patented Oct. 17, 1916.
4 SHEETS—SHEET 2.
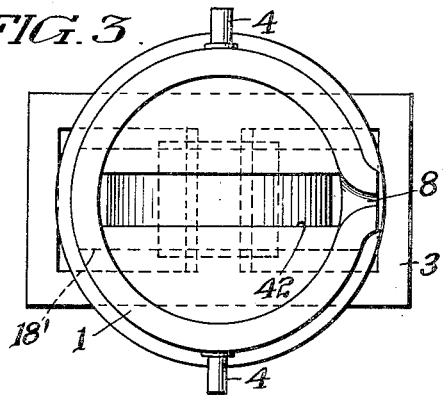
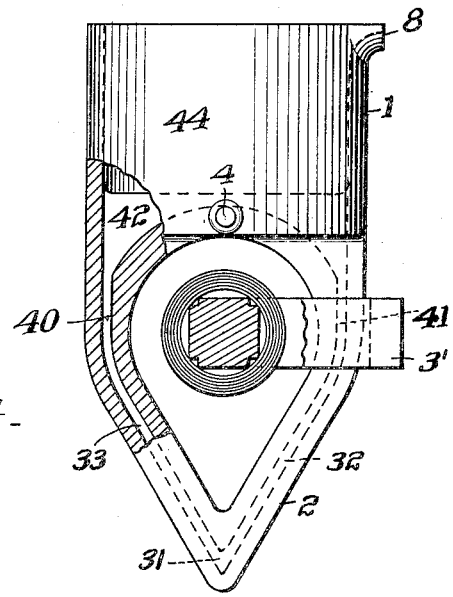
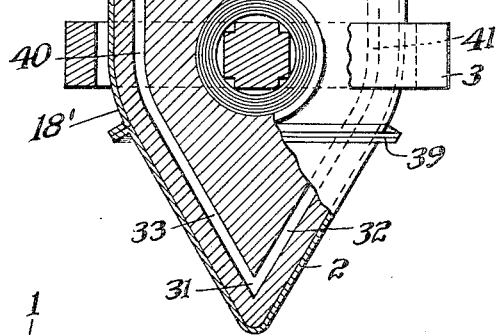
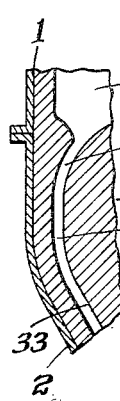
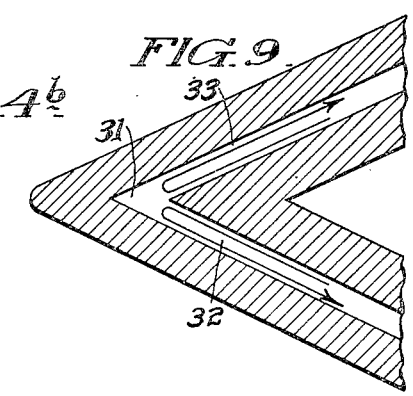
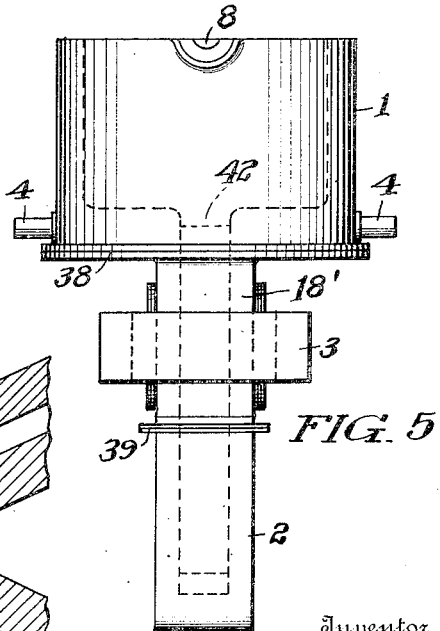
Inventor
James R. Wyatt
By W. Steell Jackson
Attorney

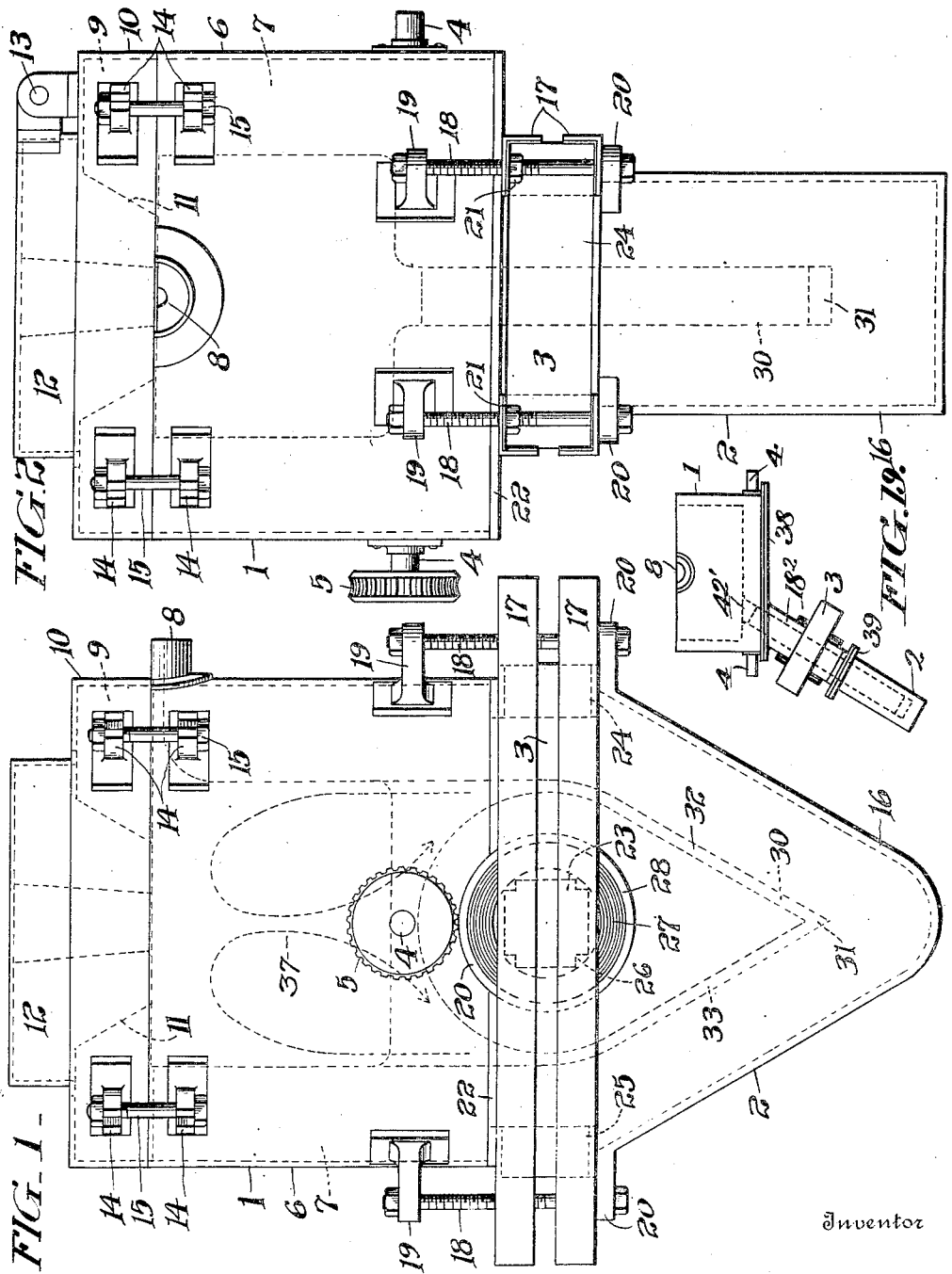

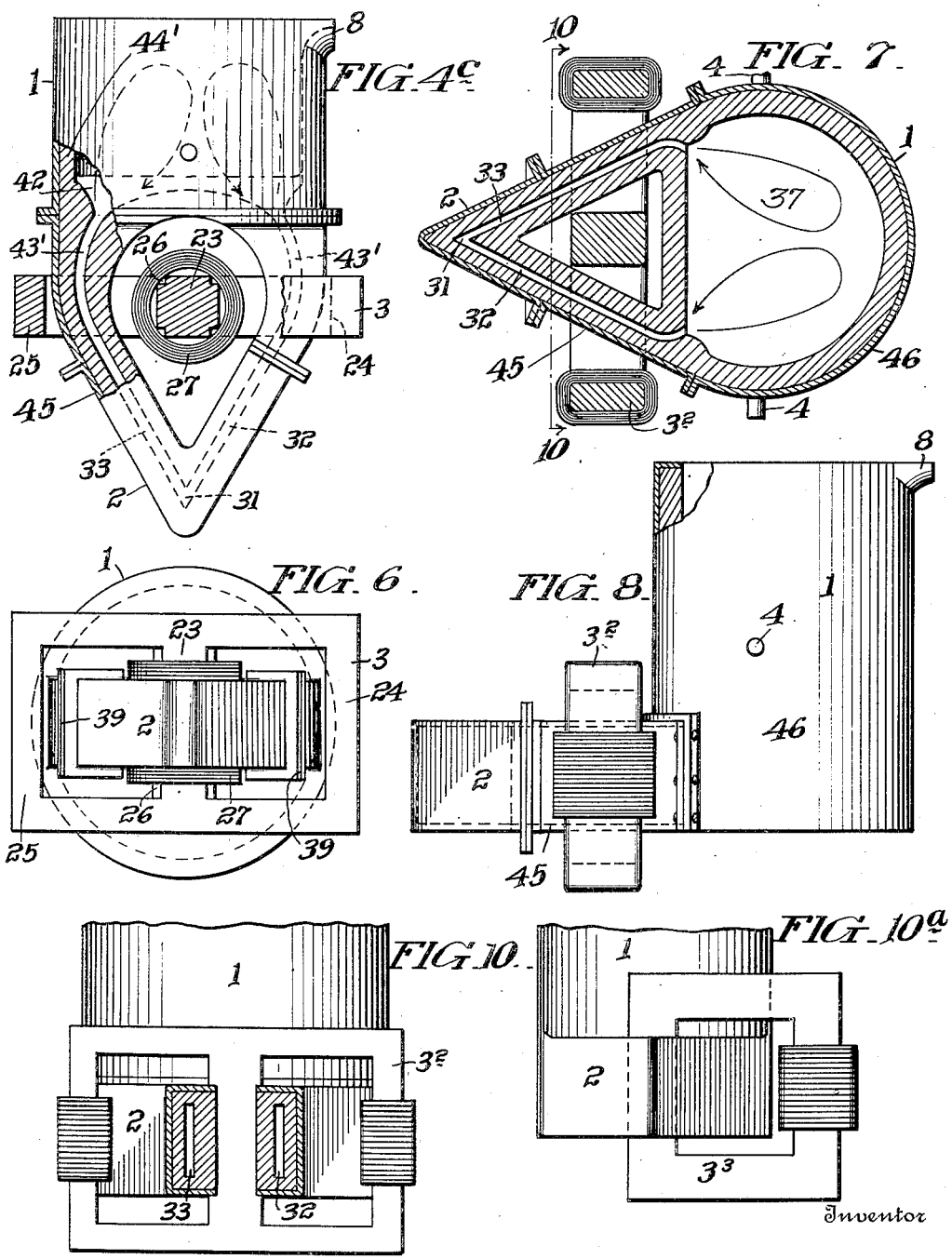

J. R. WYATT.
INDUCTION FURNACE.
APPLICATION FILED JAN. 24, 1916.
1,201,671.
Patented Oct. 17, 1916.
4 SHEETS—SHEET 4.
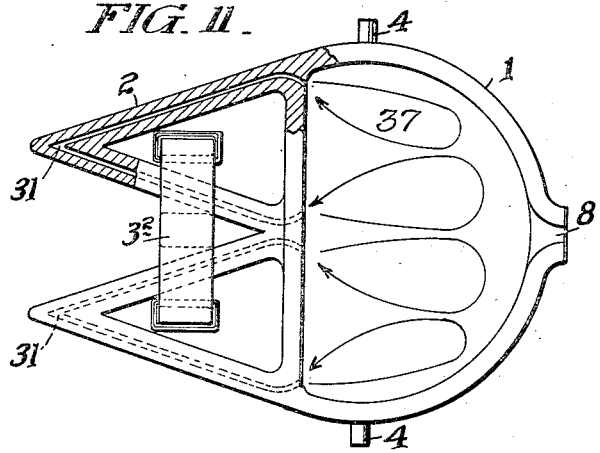
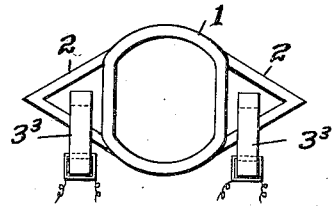
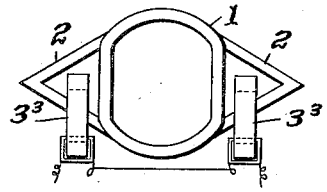
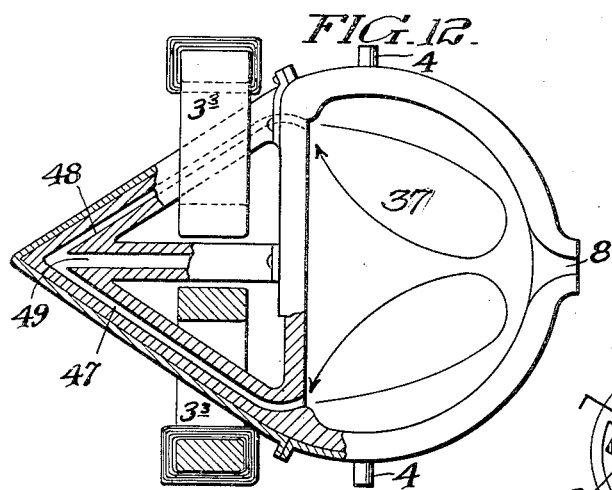
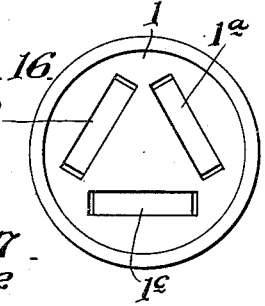
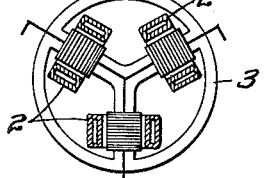
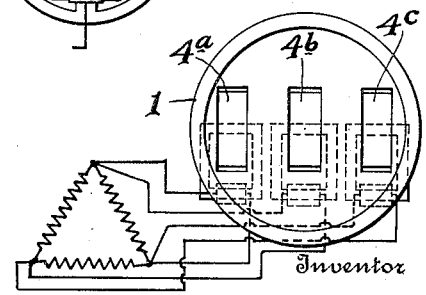

UNITED STATES PATENT OFFICE.

JAMES R. WYATT, OF PHILADELPHIA, PENNSYLVANIA, ASSIGNOR TO THE AJAX METAL COMPANY, INCORPORATED, OF PHILADELPHIA, PENNSYLVANIA, A CORPORATION OF PENNSYLVANIA.

INDUCTION-FURNACE.

1,201,671.  Specification of Letters Patent.  Patented Oct. 17, 1916.

Application filed January 24, 1916. Serial No. 73,810.

*To all whom it may concern:*

Be it known that I, JAMES R. WYATT, a citizen of the United States, residing at 2024 South Twenty-first street, Philadelphia, in the county of Philadelphia and State of Pennsylvania, have invented a certain new and useful Induction-Furnace, of which the following is a specification.

The purpose of my invention is to apply the motor effect of induced currents flowing in opposite directions close together and at an acute angle to each other to the stirring of an induction furnace pool.

A further purpose of my invention is to connect a channel having an acute angle in its passage to a pool having a considerably higher normal level than the channel with inductive stirring of the pool by motor effect discharge, securing flow of molten metal in both directions from each end of the channel.

A further purpose of my invention is to connect a pool with a channel adapted to receive a molten secondary for a transformer, the channel having an acute angle outside of the pool and avoiding acute angles in the connections between the ends of the channel at the pool side of the circuit.

A further purpose of my invention is to provide a pool with an inductively heated channel open at the pool only, having the entire channel and particularly the connection with the pool at both ends of the channel well below the pool level and having an acute angle for each phase of current utilized.

A further purpose of my invention is to stir a pool of higher level than a channel connected therewith by motor-effect-directed flow of molten metal in each direction in each of the connections between the channel and the pool, preferably forming these connections near the outer edges of the pool. In different forms of my invention I stir by nearly vertical direction given this flow within the pool to keep the two cycles of flow at the channel ends separate, deliberately turn these cycles of flow toward each other by directing the ends of the passage toward each other in a generally upward direction or produce a scouring effect by laterally directed currents well below the surface of the pool with the cycles either well separated, or directed toward each other. Obviously, partial advantages of each of these forms of vertical stirring and horizontal scouring may be obtained in varying degree by sloping the channel plane, making the plane more nearly vertical or horizontal as the advantages from the one or the other are intended to predominate.

A further purpose of my invention is in one form to utilize a crucible, or parts thereof, composed of an electric conductor of the second order whose channel parts may themselves form part of the resistor in the secondary circuit and transmit heat to the metal within the channel.

A further purpose of my invention is to practise the arts or processes and apply the forces disclosed in the specification.

A further purpose of my invention is to apply casings upon opposite sides of a transformer to form the pool and outer part of the channel, respectively of an induction furnace and to fill the space within with cementitious, refractory material about a form defining the channel and pool respectively, subsequently removing the form, thus using the transformer for mechanical protection and support of a portion of the channel lining and advantageously building a complete transformer into an induction furnace unit.

A further purpose of my invention is to support a crucible or parts thereof in a metal casing whereby the material of the crucible is relieved of the mechanical strains due to weight and exterior forces and is supported against warping strains.

I have preferred to illustrate my invention by but a few of the many forms in which it may appear, selecting therefor forms which well illustrate the principles of my invention.

Figure 1 is a side elevation of one form of the invention which has proved highly successful in actual use. Fig. 2 is a front elevation of the structure seen in Fig. 1. Fig. 3 is a top plan view of a second form of my invention. Fig. 4 is a side elevation, partly in section, of the form shown in Fig. 3. Fig. 4ᵃ is a side eelvation, partly sectioned, of a modified form of the structure shown in Fig.

4. Fig. 4ᵇ is a broken section showing a modification of the structure seen in Fig. 4. Fig. 4ᶜ is a side elevation, partly sectioned, of a further modification of Fig. 4. Fig. 5 is a front elevation of the structure seen in Figs. 3 and 4. Fig. 6 is a bottom plan view of the structure seen in Figs. 3, 4 and 5. Fig. 7 is a horizontal section of another form of my invention. Fig. 8 is a side elevation, partly sectioned, of the structure seen in Fig. 7. Fig. 9 is a broken enlarged horizontal section of a structure similar to that seen in Fig. 7. Fig. 10 is a section upon lines 10—10 of Fig. 7. Fig. 10ᵃ is a rear elevation of a structure similar to those seen in Figs. 7-10. Figs. 11 and 12 are top plan views, partly in section, of other forms of my invention. Fig. 13 is a broken rear elevation of the structure seen in Fig. 12. Figs. 14, 15, 16 and 18 are top plan views, largely diagrammatic, of other forms of my invention. Fig. 17 is a horizontal section below the pool of the form shown in Fig. 16. Fig. 19 is a front elevation of another form of my invention.

In the drawings similar numerals indicate corresponding parts.

My invention is of general application to the metals and alloys and has been successful in its application even to the remelting of chips, shavings, turnings and small pieces of brass and other alloys, which have presented difficulty to foundrymen because of the smallness of the pieces of metal and presence of metals having a vaporizing point below the melting point of the alloys. It is necessary to superheat the alloy several hundred degrees above its melting point in order to pour good castings or salable ingots and the heat losses, vaporization of metals, change of composition of the alloy and other injury to the resultant metal have been serious. Because of these and the cost, electric melting, otherwice very desirable, has been prohibitive previously.

I have applied the principles of my invention to several types of furnace, which may use a metallic casing for the channels and pool, or either of them, or may not use such casing or jacket; may use a distinct crucible or merely a refractory lining; in which the material limiting the channel or channels may be a non-conductor of electricity or a conductor thereof; in which the channel or channels may extend horizontally or vertically with respect to the pool or in an intermediate position between these; in which single-phase or multi-phase current may be used and the current may be applied in series or in multiple where several channels are utilized; and in which one or a plurality of channels may be supplied with current from a single transformer or from a single phase.

In Figs. 1 and 2 I have shown an electric furnace having in general a body 1 and channel portion 2 connected therewith by a transformer 3. These with the closure for the body are adapted to be rotated about trunnions 4 in any suitable bearings by means of worm wheel 5. The means for securing support and rotation are so well known that I have considered their illustration to be unnecessary. In this particular form, the furnace body, adapted to receive a pool of molten metal and melt the pieces of metal down into it, is made up of an outer jacket 6 lined at 7 and carrying a pouring spout 8. The upper portion of the body is partly closed by an annular tile 9 held in a shell 10 and having a conical opening in the annulus in which fits a plug 11 carried by a cover 12 hinged at 13. The shell 10 is secured to the jacket 6 by means of ears 14 and bolts 15. In this construction applicant prefers not to connect the casing 16 within which the lower part of the channel is formed directly with the body of the furnace, but to interpose the transformer between and form part of the channel actually within the transformer as distinguished from having the channel member merely pass through a gap in the transformer. In this way the shell type of transformer shown is built into the unit and forms part of the mechanical protection and frame of the complete furnace, reducing the metal parts, avoiding interruption of the magnetic circuit of the transformer in order that it may be put in place and reducing heat losses. The transformer is conveniently connected to the other parts by the use of angle irons 17 at the top and bottom. Bolts 18 pass through these and through ears 19 upon the jacket and flanges 20 of the casing, clamping the body, transformer and casing 16 firmly together. The bolts are secured by nuts 21 and corresponding nuts separately engage the under sides of the upper angle irons. A pair of brass spacing plates is shown at 22.

The transformer shown is of a single phase shell type. Its laminated magnetic circuit has a central leg 23 and end legs 24 and 25. To accomodate a close circular winding the edges of the central leg are cut, as at 26, in Fig. 4ᶜ and the winding is put on in the form of a series of layers of parallel circular bands forming a circular primary winding seen at 27 in Fig. 4ᶜ. In the structure used the primary winding 27 was formed from a flat strip of conductor wrapped with asbestos insulating tape and applied in rings interrupted at the points of cross connection with adjoining rings and also cross connected from one layer to the next at the ends of the rings of adjoining layers. The casing 16 may be formed as a casting to engage the angle irons on opposite edges of the lower part of the transformer and to engage the edge of the primary winding. In lining the furnace frame thus formed a two-part pattern was inserted having the shape of the channel and pool and having a division line between the parts at some point as 28 so that the lower part of the cementitious lining used could be placed and rammed before the upper part of the pattern could be inserted and the lower part of the pattern was put in place. Plastic material was then rammed about the form inside and out completing the lining within the casing, transformer and body of the furnace and filling the entire space about the primary winding except the portion occupied by the pattern. The pattern was then burned out. An asbestos paste insulating compound was used. It was subsequently dried out gradually.

The channel 30 is flattened in cross section, preferably of rectangular or approximately rectangular shape and with the longer dimension of the rectangle parallel with the axis of the transformer winding. The channel length is formed with an acute angle at the turn at 31 outside of the furnace and in the turn at the pool acute angles are avoided, the contour being rounded between the connections with the pool or at least obtusely angled where the connections are made with the furnace. In the form of Figs. 1 and 2 the channel meets the pool in a generally vertical direction and on opposite sides at the outer edges of the pool, thus securing a maximum effect for the stirring action produced within the channel.

When electric currents traverse fluid conductors (such as the molten fluid in the channel parts 32 and 33) and flow in opposite directions, electro-dynamic forces are set up in the conductors in directions perpendicular to the lengths of the conductors, tending to separate the conductors. These forces vary directly as the product of the currents flowing in the two conductors (as the square of the current where the same current flows in each) and inversely as the distance between the parts of fluid affected. Where these conductors are not parallel, the electro-dynamic forces vary in magnitude from one point to another along the lengths of the conductors, because of the differing distances separating them at these points and cause correspondingly varied hydro-dynamic forces tending to produce motion of the fluid parallel to the lengths of the conductors. This application of "motor effect" causes motion of the fluid and hence circulation, if the fluid be free to flow. The motor effect causing this circulation may be intensified by bringing the conductors together into an angle and becomes most effective where the angle is acute, increasing within reasonable limits with the acuteness of the angle. Though joule effect is also present, the hydro-dynamic pressure due to electro-dynamic motor effect is the dominant force in my furnace, which not only depends generally upon this pressure for circulation of the heated metal, but gets great advantage from the intensity of the pressure in the angle where overheating would otherwise take place.

As was to be expected from the theory of the motor effect, tests determined that the flow from the channel comprised hotter metal flowing outwardly along the outer walls of both branches 32 and 33 of the channel, as far away from each other as the metal could be forced, and an inward flow along the inner wall of each channel taking the place of the heated metal driven out by motor effect. This operation was evident by reason not only of the observed currents of flow, but because of the differences in temperature noted, the time of chilling of the several lines of flow and the contour of the surface where the test was performed in an open channel and pool. The obtuse angled connection with the pool portion of the circuit avoids motor effect at the junction points which, by theory, as well as by tests made, would oppose the flow of fluid from the corner 31 through the branches 32 and 33. In the tests made the outlets from the channels to the pool 37 were formed near to the outer periphery of the pool. The contour of the inner channel walls followed the lines of curves drawn from the axis of the transformer winding and having the channel passages 32 and 33 as tangents. This secured some distribution of the flow between the points of uniform channel cross section and the body of the pool. The desirability and extent of this distribution will, of course, depend upon the size and shape of pool used, the character of material handled and the views of the designer or special requirements of the intended plant, lying within the discretion of the designer in view of my disclosure herein.

In the form shown in Figs. 3, 4, 5 and 6 the same general conformation is used, as in Figs. 1 and 2, but the casing 18' is extended through the transformer and the continuity of the metal of the casing is interrupted by joints, of which two are indicated at 38 and 39. These joints, as is the case with the joints on each side of the transformer in Figs. 1 and 2, are sufficient to break objectionable magnetic circuits which might otherwise be present in the casing as the voltage in the secondary is quite low. Approximately four volts are used in the secondary in the operation of the structure of Figs. 1 and 2. Breaking the magnetic circuit in the iron reduced the losses from stray magnetic field and these losses were further reduced by the greater width than thickness of the cross section of the molten secondary which placed the molten secondary in the most advantageous position to pick up a maximum of lines from the transformer.

In the form of Figs. 3–6 I have not shown the cover for the furnace. That of Fig. 1, including casing 10 and top 12, could be used in these as in later shown forms, if desired. The form in these Figs. 3–6 is provided with straight sections 40, 41 in the passages or channels 32, 33, just below the outlets of the channels into the connecting fluid-filled depressed portion 42. The straight sections 40 and 41 form obtuse angles with the sections 32 and 33 of the lower part of the channel and with the inner boundary of this depressed portion.

Obviously, the several forms which I have described could be constructed as separate crucibles, without casings, or as separate crucibles with casings performing supporting functions merely as in some of the subsequent views. Where the structure is integral there must be proper accommodation for the insertion of the transformer middle leg, with or without its winding, through the crucible, as by separability of this leg from the rest of the transformer.

The straight sections 40 and 41 give a slightly different distribution of the outwardly flowing heated metal on the outer sides of the respective channel ends, which will be advantageous where it is desired to straighten out the line of flow before the pool is reached. The general contour of the induced flows of metal within the pool is shown by the lines in Figs. 1 and 4. The outer lines of flow representing hot metal, show the path of flow caused by the motor effect. The directions of flow of the fluid within the channel are shown by the arrows in Fig. 9, equally applicable to a channel below the pool, as in Figs. 1–6, where the head of the arrow in each case is placed upon the line indicating the flow of hot fluid.

Marked advantages of the motor effect as a driving force in the channel or channels lie in its intensity being greatest at the acute angle, as stated, and in the greater pressure at the rear as between any two points considered, which keeps the metal moving continuously and avoids intermingling of incoming fluid at an intermediate point with that which is being forced out through the outer part of the channel. This clears the metal quickly away from a point which would otherwise be a dead point and where the metal would therefore be heated unduly but for the great activity of the motor effect in the acute angle at the junction of the channel portions.

In Fig. 4ᵃ I have illustrated a structure similar to that in Fig. 4 except that no casing is used and the entire structure forms a crucible 44 of refractory material, the channel in this form containing the straight or nearly straight approximately vertical channel portions 40 and 41, such as seen in Fig. 4.

In the form shown in Fig. 4ᵃ I have indicated a different form of transformer in which but one branch of the channel is surrounded by the magnetic circuit of the transformer, intending to indicate by this difference in showing that various types of transformer may be used with the different forms of my invention, obtaining the advantages in each individual case due to the recognized advantages inherent in the type of transformer selected, the determination of the type of transformer being within the scope of those skilled in transformer use, in view of my disclosures in this regard.

In the form shown in Fig. 4ᵇ I have intended to follow in general the construction of Fig. 4 except that I have given the upper end of each part of the channel 32, 33 a turn, as at 43, to direct the flow of hot metal diagonally in the pool, with the purpose of bringing the cycles of fluid movement caused by the flow from and into the two channel extremities into closer proximity in the pool or crossing them over each other, as indicated more fully in Fig. 4ᶜ. In this form of 4ᵇ, the transformer of 4ᵃ is intended to be shown.

In Fig. 4ᶜ I have indicated a crucible 44' of refractory material which is or may be normally capable of independent use and support, but whose weight is supported by a metal cover. This also restrains the crucible from undue warping from temperature changes or other causes and protects it against injury from outside causes. The crucible is here incased in a metal casing 45 united by flanges, if desired, to a jacket surrounding the upper part or body of the crucible forming the furnace. In this form of Fig. 4ᶜ the channel portions 32 and 33 terminate in curves 43' approximating arcs of circles tangent to the directions of the channel portions 32 and 33 with the tangents to the termini of these curves upon the pool ends adapted to approach or cross each other within the pool so that the cycles of movement set up by the two directions of flow out from and into the several channel extremities may approach, or cross. The fluid of motor driven molten fluid flow from one channel terminal is thus made to approach that from the other passage terminal, as may be desired.

In all of these forms it will be noted I have made provision for placing the channel beneath the pool and driving the hot fluid in a general upward direction by the motor force. In each of the forms the ends of the passage connect with the pool preferably at approximately the same height much below the intended level of the molten metal.

In Figs. 7, 8, 9 and 10 I have shown a form of my invention in which the channel is horizontal and the entire channel lies much below the intended level of the pool so that the effect is to set up cycles of flow, outlined generally in Fig. 7, in horizontal planes at any height from the bottom of the pool at which it may be desirable to place the channel. I prefer to place the bottom of the channel approximately on a level with the bottom of the pool but this will obviously not have the same importance for all intended uses. The generally upward and horizontal directions of discharge of channel into the pool offer differing advantages depending somewhat upon the shape of pool which is desirable. Between the two positions of generally vertical and generally horizontal placing of the channel indicated in Figs. 1 and 7, for example, there is obviously a range of angular positions which approach the advantages of vertical or horizontal placing in proportion as they approach the vertical and horizontal positions of the channel plane, each presenting to a complementary degree the advantage of the other form; and it is my intention to include within the scope of my broader claims structures having the channel plane in intermediate (diagonal) positions. One of these is shown in Fig. 19, where the channel lies between the horizontal and perpendicular. Here I have preferred to follow the general type of Fig. 5 in placing the trunnions 4 in a vertical plane transverse to the channel and the pouring spout as shown, though this furnace, of course, could tilt and pour in a different direction with respect to the channel.

The length of the channel will be dictated by the total resistance which it is desired to have in the secondary path, the width of the pool with which the channel ends are to be connected, whether the channel ends are to terminate near the extreme sides of the pool or not, the strength of current which is to be used, the area of cross section of the channel, the conductivity of the metal being handled and other well-recognized factors entering into the attainment of a high power factor for the circuit. As the motor effect is advantageous, whatever the amperage of current, and in proportion to its square whatever the shape of the cross section, and the same for a given current strength, whether the cross section be small or large, the area of section and its shape are dictated by the desirable width of section to receive the transformer flux and the requirements that it must be large enough to avoid undue friction preferably, small enough for the flow of molten metal to constitute a jet and the volume discharged must bear a proper proportion to the total size of the pool.

In the form shown in Figs. 7–10, a crucible of refractory material may be incased in a protective and supporting casing or the casing itself may be lined with a cementitious preferably non-conducting refractory material to provide the paths indicated. The motor force obtained here is substantially the same as that to be obtained in the forms having the channel directly beneath the body of the pool but there is less benefit from joule effect. The reduction in benefit from joule effect is due to the great difference in flow of heated fluid through horizontal channels as compared with that through vertical channels, inasmuch as the tendency to rise is transverse to the horizontal channels, but nearly longitudinal in the channels lying in vertical planes. The planes of flow of the cycles at the two channel extremities being horizontal, there is less mixing between different vertical stratifications of molten metal having corresponding differing temperatures. The casing and jacket 45 and 46 are united by flanges in any suitable manner. In this form I have shown the windings as divided and placed upon the outer legs of the transformer frame.

In Fig. 10$^a$ I have indicated a form corresponding generally with Fig. 8, but in end elevation and illustrating a crucible without an inclosing casing and a different type of transformer, $3^3$ surrounding but one portion of the channel.

In Fig. 11 I have indicated a tank of the general form shown in Figs. 7–10 but with two channels having an acute angle 31 in each. Adjoining legs of these channels meet at the middle of the pool and both channels are operated by a single phase transformer $3^2$ of the shell type surrounding one portion of each complete channel. The general character of the cycles of molten metal movement is indicated by the arrows. As a matter of illustration, I have selected a crucible form without a casing, though obviously this could be varied in view of my disclosure herein. It will be evident that multiple channels could be used more or less directly beneath a pool as in Figs. 1 and 2.

In Figs. 12 and 13 I have shown a plurality of complete channels 47, 48 each having an acute angle and one independent channel portion and having the adjoining channel members united in a common channel 49. Separate transformers $3^3$ are here shown, which could indeed be used in Fig. 11. These transformers may evidently be fed by the same single-phase alternating current circuit in series or in parallel and the two can be fed from different sides of a two phase circuit, with advantageous balancing of the two-phase circuit.

In Figs. 14 and 15, horizontally disposed acute angled channels are shown diagrammatically of the general character shown in Figs. 7 to 10 and 10ª, but with two channels located about different sides of the pool here opposite to each other. The pool is intended to have a level considerably above the point at which the channels enter it. In Fig. 14 separate electrical connections are shown as for different sides of a two phase circuit and in Fig. 15 the transformer windings are intended to be shown as in series upon a single phase or side of a circuit.

In Fig. 16 I have shown a pool having a plurality of acute angled channels lying beneath it, each of the general type shown in Figs. 1 to 6, 1ª, 1ᵇ, 1ᶜ, the three channels shown being arranged to give advantageous combined stirring effect by the intermingling of the flows caused at the terminals of their six channel members. They are adapted, if desired, for multiphase work. A section of a transformer and Y connections for three-phase current, is shown in Fig. 17.

In Fig. 18 I have shown a top plan view of a furnace having three acute angled channels connected with it in multiple, the outlets of the channels being shown as in line respectively on the two sides. Each channel is intended to be of the general type in Figs. 1 to 6, 4ª, 4ᵇ and 4ᶜ and the transformers can be operated separately or in conjunction with each other upon single or three-phase circuit or single and two phase circuit, as will be apparent to those skilled in the transformer art, particularly in view of the disclosure of variant transformer use with different forms of my invention shown in this application. I have shown the transformers as connected to a three-phase delta circuit.

In operation, the molten metal within the channel and that within the connecting pool form the resistor within which the secondary circuit of the transformer is set up. The active force of the motor effect, most intense at the angle, is effective to lessening degrees throughout the entire diverging lengths of the two channel branches 31 and 32, causing a steady flow of hot metal along the outer walls of the two branches which will be effective as a jet if the cross section be not excessive. Cooler molten metal flows in along the inner walls of both channel branches to take the place of the hot metal driven out. The character of the stirring action of the jet within the pool is within the control of the designer by control of its direction of entry and its proportion to the size of the pool. Where the channel wall is itself a conductor of electricity, whether of the first or second order, the heat generated by the electric current flow through its walls may be utilized in assisting in the heating of the fluid content; and this is desirable in some cases such, for example, as in melting solder or keeping a lead bath hot for tempering purposes. I have found it desirable to pour the contents of the pool and channel out when the furnace is to be chilled.

It will be noted that all the forms may be mounted in any suitable way to meet the required conditions for tilting or ladling the metal out and may be provided with such suitable covers and other equipment as may be desired. Where a conductor of the second order is desired for the crucible, I prefer to use plumbago: however, my best results have been attained with a lining which was a non-conductor and with a casing thereabout whose electric circuit was interrupted to prevent electric flow therein.

It will be noted that in all of my forms the transformer embraces the channel and independent whirls are set up in the pool at each point of connection of the channel.

Where I have referred to stirring of the pool, it will be obvious that the function and purpose of the stirring is to distribute the hotter metal from the channel and replace by cooler metal from the pool, until the pool has been heated with sufficient uniformity to the required temperature: and where I have said "surrounding the channel" I mean to include a transformer surrounding either branch thereof.

Having thus described my invention, what I claim as new and desire to secure by Letters Patent is:—

1. In an induction furnace, a pool for molten metal, walls forming a closed channel lying wholly below the level of the pool, said channel communicating with the pool at two points and having parts of the channel forming an acute angle at a distance from the pool, in combination with a transformer for which the metal in the channel acts as secondary, setting up motor effect in the acute angle of the channel.

2. In an induction furnace, a pool for molten metal, in combination with walls forming a channel for said metal leading outside of the pool, said channel forming obtuse angles with the intervening wall at the part connecting with the pool and having an acute angle in the channel at a distance from the pool, in combination with a transformer surrounding the channel and for which the channel operates as secondary whereby electric current flows in opposite directions in the parts of the channel divided by the acute angle and motor effect is emphasized at the acute angle and minimized at the obtuse angles.

3. In an induction furnace, a pool adapted to contain molten metal, walls forming a channel lying mainly beneath the pool and communicating with opposite sides of the pool near its periphery, said channel forming an acute angle at a distance below the pool in combination with a transformer inducing current through the channel content as secondary, past the acute angle, whereby motor-effect drives molten metal up through the body of the pool on the outer sides of the channel and downward flow of molten metal takes place along the inner channel sides, stirring the metal in a general upward direction.

4. In an induction furnace, a pool adapted to contain molten metal, in combination with walls forming a channel well below the level of the pool, said channel having substantially straight side portions communicating at an acute angle and connected at their opposite ends with the pool and a transformer embracing the channel, utilizing the fluid metal in the channel as secondary and setting up motor effect greatest at the acute angle.

5. In an induction furnace, a pool adapted to contain molten metal, in combination with walls forming a channel having substantially straight side portions communicating at an acute angle and connecting with the body of the pool by channel portions curved on the inner sides approximating in section a circle through the axis of the transformer winding tangent to the straight channel portions and a transformer embracing the channel, utilizing the fluid metal in the channel as secondary and setting up motor effect greatest at the acute angle.

6. In an induction furnace, a furnace body adapted to contain a pool of molten metal in combination with walls forming a channel beneath the pool, said channel being connected at the opposite ends to the pool, having an acute angle outside of the pool and obtuse angles at the junction with the body of the furnace, and at the junction with the pool having a generally upward direction, a transformer embracing the channel and inducing current flow in the channel as a secondary about the acute angle whereby circulation is produced upwardly along the outer limiting surfaces of said channel at each point of connection with the pool and takes place downwardly along the inner limiting surfaces of the channel.

7. In an induction furnace, a furnace body adapted to form a pool for molten metal, walls forming a groove across the bottom of the pool, walls forming a channel connected with the groove at both ends and connecting with the groove bottom by obtuse-angles and a transformer inclosing the channel and adapted to induce flow of electricity in said channel as a secondary.

8. In an induction furnace, a furnace body adapted to form a pool for molten metal, walls forming a groove across the bottom of the pool, walls forming a channel connected with the groove at both ends and a transformer inclosing the channel and adapted to induce flow of electricity in said channel as a secondary.

9. In an induction furnace, a furnace body adapted to hold a pool of molten metal, in combination with walls forming a channel, said channel lying wholly below the intended working level of molten metal and having its points of engagement with the molten metal at substantially the same height, said channel having an acute angle at a distance from the furnace body and connected with the body by obtuse angles and a transformer surrounding the channel using the molten metal in the channel as its secondary and inducing flow of molten metal by motor effect in both directions in each branch of the channel adjoining the acute angle.

10. In an induction furnace, a furnace body adapted to hold a pool of molten metal, in combination with walls forming a channel, said channel lying wholly below the intended working level of molten metal and having its points of engagement with the molten metal at substantially the same height, said channel having an acute angle at approximately the middle of its length and a transformer surrounding the channel using the molten metal in the channel as its secondary and inducing flow of molten metal by motor effect in both directions in each branch of the channel adjoining the acute angle.

11. In an induction furnace, a furnace body having a contour curved in horizontal sections and adapted to contain a pool of molten metal, in combination with walls forming a closed channel, said channel connecting with the pool at its opposite ends, in proximity to the perimeter of the internal curved wall of the furnace body and having an acute angle bend outside of the furnace body, and a transformer inducing current in the molten channel content to produce motor effect greatest at the acute angle and cause flow of current in both directions at each point of channel connection with the furnace body.

12. In an induction furnace, a furnace body adapted to form a pool for molten metal, in combination with walls forming a channel, said channel communicating therewith near the periphery of the pool, in substantially parallel directions, said channel having an acute angle bend at a distance from the furnace body and a transformer inducing current in the channel content and causing motor effect at the acute angle whereby outward and inward flow is caused at each connection of the channel with the furnace body.

13. In an induction furnace, a furnace body adapted to hold a pool of molten metal, in combination with walls forming an acute angled channel connected therewith, said channel having approximately rectangular cross section of greater dimension in one direction than at right angles thereto and having the sides of greater dimension of the channel toward each other, and a transformer surrounding the channel.

14. In an induction furnace, a furnace body adapted to hold a pool of molten metal, in combination with walls forming an acute angled channel connecting therewith at the ends remote from the acute angle and having generally rectangular cross section of greater dimension in one direction than at right angles thereto and a transformer surrounding the channel.

15. In an induction furnace, a furnace body adapted to hold a pool of molten metal, in combination with walls forming a channel connected therewith well below the top of the pool and having generally elongated cross section, the longer dimension of the cross section being perpendicular to the planes through the length of the channel, and a transformer surrounding the channel.

16. In an induction furnace, a furnace body adapted to hold a pool of molten metal, in combination with walls forming a channel extending beneath the pool, communicating with the pool on opposite sides of the center thereof and having a cross section considerably greater in one direction than at right angles thereto, the longer dimension of the cross section being perpendicular to the planes through the length of the channel, and a transformer surrounding the channel.

17. In an induction furnace, a furnace body adapted to hold a pool of molten metal, in combination with walls forming a channel connecting therewith, said channel having generally elongated cross section of greater dimension perpendicular to the planes through the length of the channel than within said plane and a transformer surrounding the channel.

18. An induction furnace comprising the combination of a crucible for holding molten metal, a return bend resistor having a single acute angle for each phase and of rectangular cross-section and having its ends in communication with the crucible and arranged at the same level, and transformer provisions between the acute angle and the crucible and coöperating with the resistor and causing therein a maximum electro-dynamic force at the acute angle which causes flow of metal in both directions in each leg of the resistor.

19. An induction furnace comprising the combination of a crucible for holding molten metal, a closed return bend resistor below the level of the molten metal in the crucible having one acute angle for each phase and having its ends in communication with the crucible, and transformer provisions disposed between said acute angle and crucible and coöperating with the resistor and causing therein a maximum electro-dynamic force at the acute angle which causes flow of metal in both directions in each leg of the resistor.

20. An induction furnace comprising the combination of a crucible for holding molten metal, a continuous resistor of rectangular cross-section having a single acute angle for each phase and having its ends in communication with the crucible, and transformer provisions operatively arranged between said acute angle and crucible and coöperating with the resistor and causing therein a maximum electro-dynamic force at the acute angle, which causes flow of metal in both directions in each leg of the resistor.

21. An induction furnace comprising the combination of a crucible for holding molten metal, a return bend resistor having one acute angle and having legs obtuse-angled where they come into communication with the crucible, and transformer provisions interposed between the acute angle and the crucible and coöperating with the resistor.

22. An induction furnace comprising the combination of a crucible for holding molten metal, material forming a channel connected therewith, said channel having an acute angle at a distance away from the crucible, said channel material being a conductor of electricity of the second class and adapted to contain a resistor of molten metal in communication with the metal of the crucible and transformer provisions interposed between the acute angle and the crucible and coöperating with the second class conductor and resistor.

23. In an induction furnace, a jacket for the body of the furnace, a transformer secured against the jacket and having a passage therethrough, a casing for a channel secured on the opposite side of the transformer from the body and a filling for the furnace body, extending through the transformer passage and into the channel casing, forming a pool receptacle in the furnace body and a channel connected therewith and extending through the transformer.

24. In an induction furnace, a furnace body jacket, a channel casing, a transformer secured to the jacket by means of the casing and a lining forming a furnace body and channel connected therewith.

25. In an induction furnace, a furnace body jacket, a channel casing, a transformer spacing the jacket and casing, means for pressing the transformer against the jacket and the casing against the transformer and a lining forming a furnace body and connecting channel passing through the transformer on opposite sides of the transformer winding.

26. In an induction furnace, a furnace body jacket, a transformer engaging the jacket on one side and having three legs, a channel casing engaging the opposite side of the transformer and a lining forming a furnace body and connecting channel passing through the transformer on opposite sides of the middle transformer leg.

27. In an induction furnace, a jacket for a furnace body, a casing for a channel, a transformer between the jacket and casing and a continuous lining passing through the frame of the transformer and into the channel casing to receive a pool within the furnace body and form a channel through the transformer connected with the furnace body.

28. An induction furnace comprising the combination of a crucible for holding molten metal, a return bend resistor of plumbago having one acute angle and having obtuse-angled legs in communication with the crucible, and transformer provisions interposed between the acute angle and the crucible and coöperating with the resistor.

29. An induction furnace comprising the combination of a plumbago crucible for holding molten metal, a return bend resistor having one acute angle and having obtuse-angled legs in communication with the crucible, and transformer provisions interposed between the acute angle and the crucible and coöperating with the resistor.

30. An induction furnace comprising the combination of a crucible for holding molten metal and a return bend resistor, both formed of plumbago and the resistor having a channel therethrough, acute angled at one point and communicating at a distance from the angle with the crucible and a transformer inducing current in the resistor and channel.

31. The process of mixing molten metal within a pool which consists in applying motor effect drive to fluid within a channel beneath the pool connecting with the pool in proximity to its perimeter in an upward direction and thereby causing flow of hot metal into the pool along the outer edges of the channel connection with inward flow of metal along the inner edges of each connection.

32. The process of producing motor effect stirring of molten metal within a pool which consists in providing a molten conductor connecting with the pool at two points, forming the turn in the conductor outside of the pool at an acute angle and the connections with the pool at obtuse angles and inducing a flow of electric current through the conductor as secondary about the acute angle.

33. The process of mixing molten metal in a furnace which consists in providing a molten conductor outside of the furnace well below the fluid level of the furnace connecting with the furnace in proximity to the perimeter of the channel, forming an acute angle in the conductor at a point distant from the furnace, forming the conductor in proximity to its connection with the pool substantially parallel with the sides of the pool and inducing electric current through the conductor as a secondary about the acute angle to cause ejection of the metal from the outer part of the conductor along its length by motor effect with resultant flow of cooler molten metal inwardly along the inner side of the conductor.

34. The process of protecting a heating channel connected with a furnace pool from overheating and securing circulation therein which consists in forming the outer part of the channel wall at a distance from the furnace at an acute angle to emphasize motor effect and effectively removing antagonistic motor effect at the points of channel connection with the pool to be heated by forming the material between the points of connection at an obtuse angle to the connections of the channel with the pool.

35. The method of stirring the molten pool of a furnace by the hydro-dynamic effect of induced electric currents which consists in setting up whirls of hotter metal entering the pool at two points about the perimeter of the pool and withdrawing relatively cooler metal from the pool at approximately the same points from the body of the pool along the inside of the hotter metal path.

36. The method of stirring the molten pool of a furnace by the hydro-dynamic effect of induced electric currents which consists in setting up whirls of relatively hotter metal at two points entering the furnace body at both points the lines of circulation caused thereby, turning toward each other and resulting in relatively cooler metal flowing out from the pool along the inside of the hotter metal path.

37. The method of stirring the molten pool of a furnace by the hydro-dynamic effect of induced electric currents which consists in setting up whirls of hotter metal entering the pool at two points about the perimeter of the pool and near its bottom and withdrawing relatively cooler metal from the pool at approximately the same points from the body of the pool along the inside of the hotter metal path.

JAMES R. WYATT.

Witnesses:
J. LUTHERIA KAUFFMAN,
WM. STEELL JACKSON.